United States Patent [19]
Futral et al.

[11] Patent Number: 5,925,099
[45] Date of Patent: *Jul. 20, 1999

[54] METHOD AND APPARATUS FOR TRANSPORTING MESSAGES BETWEEN PROCESSORS IN A MULTIPLE PROCESSOR SYSTEM

[75] Inventors: William T. Futral, Portland, Oreg.; Elliot Garbus, Scottsdale; Barry Davis, Chandler, both of Ariz.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/490,651

[22] Filed: Jun. 15, 1995

[51] Int. Cl.$^6$ ............................................. G06F 13/00
[52] U.S. Cl. .................................... 709/204; 709/200
[58] Field of Search .............................. 395/200.01, 800, 395/292, 200.13, 680, 200.3, 200.34, 800.01; 364/DIG. 1

[56] References Cited

U.S. PATENT DOCUMENTS

| | | | |
|---|---|---|---|
| 4,445,176 | 4/1984 | Burk et al. ......................... | 364/DIG. 1 |
| 4,682,284 | 7/1987 | Schrofer .............................. | 364/200 |
| 4,914,653 | 4/1990 | Bishop et al. ...................... | 370/85.6 |
| 4,956,771 | 9/1990 | Neustmedter ....................... | 364/200 |
| 5,166,674 | 11/1992 | Baum et al. ....................... | 340/825.07 |
| 5,333,269 | 7/1994 | Calvignac et al. ................. | 395/200 |
| 5,428,766 | 6/1995 | Seaman .............................. | 395/200.45 |
| 5,459,839 | 10/1995 | Swarts et al. ..................... | 395/292 |
| 5,530,933 | 6/1996 | Frink et al. ....................... | 395/468 |
| 5,581,705 | 12/1996 | Passint et al. ................... | 395/200.13 |
| 5,619,687 | 4/1997 | Langan et al. ..................... | 395/557 |

OTHER PUBLICATIONS

Ramachandran et al., "Hardware Support for Interprocess Communication", *IEEE Transactions on Parallel and Distributed Systems*, Jul. 1990, pp. 318–329.

*Primary Examiner*—Meng-Ai T. An
*Assistant Examiner*—Walter D. Davis, Jr.
*Attorney, Agent, or Firm*—Blakely, Sokoloff, Taylor & Zafman

[57] ABSTRACT

A message unit that provides a hardware queue interface between a host processor and a local processor handling I/O operations in an I/O platform. Circuitry manages the head and tail pointers of an inbound free queue, an inbound post queue, an outbound free queue and an outbound post queue. Circuitry is also provided for enabling a host processor or bus agent to access these queues in a single bus transaction by reading or writing inbound port registers or outbound port registers. The queue elements contain handles of message buffers. The invention automatically performs the specific task of locating the next element in a queue, altering that element, and modifying a queue descriptor (i.e., a head or a tail pointer) to indicate the next element for a next queue access. A plurality of registers are used for selectively interrupting either the host processor or the local processor when the queues are written to by either the host processor, a bus agent, or the local processor.

5 Claims, 13 Drawing Sheets

METHOD AND APPARATUS FOR TRANSPORTING MESSAGES BETWEEN PROCESSORS IN A MULTIPLE PROCESSOR SYSTEM

BACKGROUND OF THE INVENTION

1. Field of the Invention

This invention relates to the field of multiple processor systems. More particularly, this invention relates to a method and apparatus for transporting messages between processors in a multiple processor system.

2. Description of the Related Art

A message is simply a data structure for conveying operational parameters and data. Messages are generated by one or more processes (i.e., applications) executing on one or more platforms. A platform includes a processor or cluster of processors, associated memory, and a local memory bus, and a memory input/output bus. These elements within a platform make up an operating environment.

Moreover, a platform executes a single instance of an operating system. In other words the computer system is a distributed processing system in which a single operating system supports multiple processors. After a message is generated by one of the processes on one particular platform, it is sent to another processor platform for processing.

A message may be indicated by a pointer to a control block, residing in memory, that includes instructions and other pointers to additional data blocks of information. For example, a control block may specify a particular peripheral device (i.e., a hard disk drive), and request that data be read from specified sectors of the device.

Message passing is used between processors in a symmetric multiple processor system (SMP) where the processors are "tightly coupled" (i.e., where processors share a single cache) and in asymmetric multiple processor systems, where processors are "loosely" coupled together by a common bus structure.

When a message is passed from one processor in a first platform to a second processor in a second platform, there is a need for the message to be queued so that the processor, to which the message is directed, may process the message when its resources are free.

The prior art methods for queuing messages are primarily implemented using software techniques. These methods require multiple atomic accesses to shared queue structures. For example, a plurality of processes, running on a single processor, may share one queue of messages, located in a memory shared by the processors. To achieve an atomic access for one of the processes, an operating system grants to the process, requesting access to the queue, a semaphore that gives that process exclusive rights (i.e., atomic access) to the queue. A semaphore is simply an operating system variable that gives a process exclusive access to a shared data structure (i.e., part of the operating system context). The process may then add or remove a message from the queue. When a particular process controls the semaphore, it locks out other processes requiring access to that queue. The other processes must wait for the first process to release the semaphore before access to the shared structure is available.

In a multiple processor system, more than one processor could be trying to gain access to the semaphore concurrently. Thus, a bus lock is required for synchronization (i.e., atomic access). While one processor has the bus locked, another processor cannot access the same shared structure in memory (i.e., a memory block) until the first processor unlocks the bus. Since semaphores are in system memory, the other processors are locked out even though they are not contending for a semaphore. Therefore, a bus lock can never be used in a software module that can be suspended (i.e., a multi-tasking operating system). Instead, a call to the operating system kernel is required when obtaining and releasing a semaphore in these applications.

The above-described operation is very inefficient because of the amount of time each process spends idle while waiting for semaphores or waiting for bus access. Furthermore, the above-described calls to an operating system kernel cause expensive context switches.

Context is simply a memory area that is dedicated to an application (i.e., application code and data). An application context includes flags, variables, and states of a current process. Since a semaphore is an operating system variable in a different context (i.e., an operating system context) than an application context, system resources are necessary to switch contexts. For example, in a context switch data pointers are changed, pointers are pushed onto stacks, and process control parameters are also modified.

Prior art computer systems that do not have a bus lock capability use highly complex algorithms to provide synchronization between processors. In these systems, performance is further reduced.

Thus, there is a need for a method and apparatus for efficiently allowing direct access to the queues without the use of semaphores.

SUMMARY OF THE INVENTION

A method and apparatus for transporting messages between processors in a multiple processor system. The present method and apparatus enables the communication of messages between processors in an asymmetric multiple processor system. An asymmetric multiple processor system is simply a system where the processors are concurrently executing different operating systems. For example, application processors on the application platforms are running standard application operating system software such as Windows NT™. However, the processor on the I/O platform is running a specific operating system adapted for I/O operations (e.g., real time operating system: RTOS). Specifically, the present invention provides a fast and direct mechanism for queuing messages from one or more processes executing on one or more processor platforms to a platform that includes a local processor.

The present invention provides an inbound free queue that allocates message buffers to the other platforms, and an inbound work queue that posts messages from processors and bus agents external to the I/O platform. Moreover, the present invention provides an outbound work queue that posts messages from a local processor (i.e., processor for an I/O platform) to another processor platform (i.e., a host processor) such that processors on other platforms may retrieve these messages. The present invention also provides an outbound free queue to which the host processor may release message buffers. This queue releases message buffers to the local processor, after the host processor has processed the message.

The present invention manages these queues with a messaging unit which provides a very fast and efficient hardware queue interface between the host platform and the I/O platform. The present invention enables the provision of a free message buffer or an "Empty" indicator in a single PCI bus transaction cycle (i.e., reading a register in the messaging unit). Furthermore, the present invention enables the posting or retrieving of a message or a "Full" indicator in a single PCI bus transaction (i.e., writing to a register in the messaging unit).

Managing the queues with a hardware interface, the present invention provides several advantages over prior art software queue management techniques. First, the present invention avoids deadlock or lock up when a process attempts to perform a queue operation on a full or empty queue. The messaging unit of the present invention quickly returns an empty indication when an attempt to fetch from an empty list or queue is detected. Similarly, the present invention quickly returns an indication that a particular queue is full when an attempt to post to a full queue is detected. The present invention may be efficiently implemented with minimum hardware resources.

Furthermore, since the present invention executes a queue access in a single bus transaction cycle, the need for synchronization (i.e., acquiring and releasing semaphores) is eliminated, and the performance of the system is improved significantly. A queue access is simply the adding of an element to a queue or the removing of an element from a queue. A queue access may include the specific tasks of locating the next element, altering that element, and modifying a queue descriptor to indicate next element for the next queue access. These tasks are automatically performed by the present invention. During the time these tasks are being completed, the queue must be locked such that another process does not acquire the same message buffer or overwrite another message. The present invention provides queue access in one bus transaction to take advantage of the fact that a single PCI bus transaction is inherently atomic (i.e., exclusive access by a bus agent executing the transaction) Furthermore, the present invention automatically handles synchronization through a ready and a retry signal.

Moreover, context switches that tie up system resources are no longer necessary since the present invention obviates the need for semaphores. Semaphores are no longer required because a single read or write to a register in the messaging unit is all that is required to access a particular queue, and a read or write may be accomplished in one bus transaction.

BRIEF DESCRIPTION OF THE DRAWINGS

The present invention is illustrated by way of example and not limitation in the figures of the accompanying drawings in which like references indicate similar elements, in which.

DETAILED DESCRIPTION OF THE INVENTION

Figure 1:
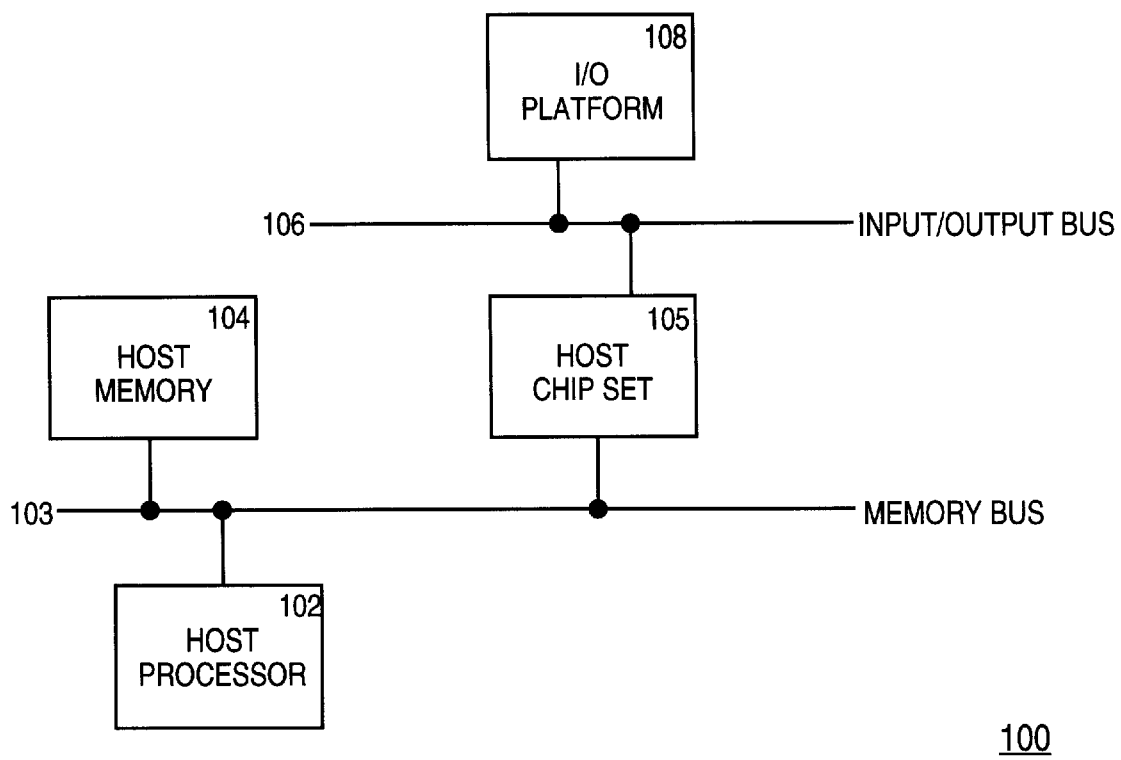
FIG. 1 illustrates a block diagram of an asymmetric multiple processor computer system implementing the present invention.

FIG. 1 illustrates a block diagram of a multiple processor computer system implementing the present invention. Multiprocessor system 100 includes a host processor 102. The host processor 102 may include a plurality of processors (i.e., a cluster of tightly coupled processors). The host processor 102 is coupled to a host memory 104 through host bus 103. A memory bus 103 also couples the host processor 102 and memory 104 to a host chip set 105. Host chip set 105 includes a memory controller, a cache controller, and a bridge providing the interface between the memory bus 103 and an input/output (I/O) bus 106 (e.g. a PCI bus).

A host chip set 105 is known in the art. For example, when the host processor 102 is a Pentium™ processor made by Intel, a suitable host chip set 105 is the Trident™ chip set also made by Intel. Similarly, if a P6™ processor is used, then a suitable host chip set 105 is the Orion™ chip set also made by Intel. The host processor 102, memory bus 103, host memory 104, and host chip set 105 will be referred to as a host platform in this multi-processor system 100.

The multiple processor system 100 further includes an I/O platform 108 that is coupled to the first PCI bus 106. Furthermore, I/O platform 108 provides an interface between an address space of a first PCI bus 106 and an address space of a processor included in the I/O platform 108. I/O platform 108 may also include a bridge that couples the first PCI bus 106 to a second PCI bus (not shown).

I/O platform 108 further provides I/O support for the host processor, and devices (not shown) coupled to the first PCI bus 106 and the second PCI bus.

Figure 2:
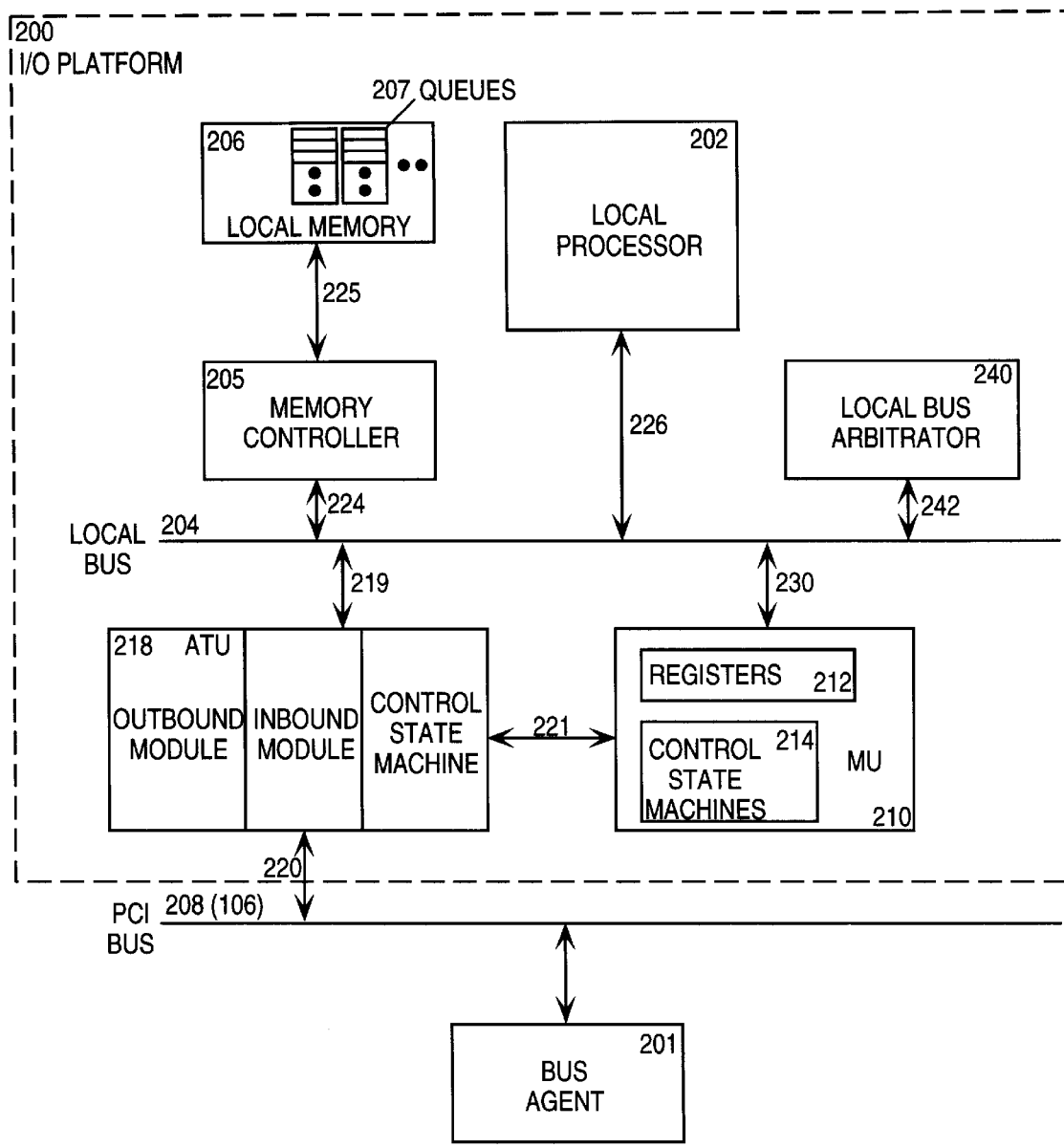
FIG. 2 illustrates an I/O platform including the present invention.

FIG. 2 illustrates in further detail the I/O platform 200 (previously referred to as element 108 in FIG. 1) that includes the present invention. The I/O platform 200 includes a local processor 202 coupled to local memory 206 via a memory controller 205 through a local bus 204. The local processor 202 may be an Intel 80960 JF processor.

An address translation unit (ATU) 218 is coupled to the local bus 204 and to the first PCI bus 208 (previously refereed to as element 106 in FIG. 1). The address translation unit (ATU) 218 translates addresses in the address space of the PCI bus 208 into addresses in the processor 202 address space and vice versa. Thus, a transaction on the PCI bus 208 having an address in PCI address space, must be translated into a local bus 204 address space so that the memory controller 205 may access the correct location in local memory 206 or the proper register 212 in MU 210.

The ATU 218 includes an outbound module for translating local bus transactions to PCI bus transactions, an inbound module for translating a PCI bus transaction to a local bus transaction and a control state machine to manage this address translation. With respect to the present invention, the ATU 218 can be seen as an address decoder that detects that a particular PCI bus transaction accesses one of the registers 212 in the MU 210. The ATU 218 after detecting that a transaction is an access to one of the registers in the MU 210, sends a signal through data path 221 to initiate the control state machines 214 in the MU 210, which will be described hereinafter. The control state machines 214 send a plurality of signals through data path 221 to the ATU 218 to notify the ATU 218 that the MU 210 is either not ready to receive the transaction or to instruct the ATU 218 to signal a Retry to the requesting process.

Local bus arbitrator 240 grants control of the local bus 204 to any of the local bus masters (i.e., the MU 210, the inbound module of the ATU 218, and the local processor 202). The arbitration circuit 240 is well known in the art.

Memory controller 205 is provided for accesses to the local memory 206 through data paths 224 and 225. Although local bus 204 is shown as a single data path, the local bus 204 may consist of an address portion and a data portion.

Bus agent 201 may be a host processor or another I/O platform. Moreover, bus agent 201 may include the host memory 104, host processor 102, the host chip set 105, and the host bus 103 of FIG. 1. In other words, bus agent 201 may itself be a subsystem or any intelligent bus agent.

A messaging unit (MU) 210 is coupled to the local bus 204 and to the ATU 218. The MU 210 embodies the teachings of the present invention and includes a plurality of registers 212 and a plurality of state machines 214. These registers 212 and state machines 214 will be further described with reference to FIG. 3.

Figure 3:
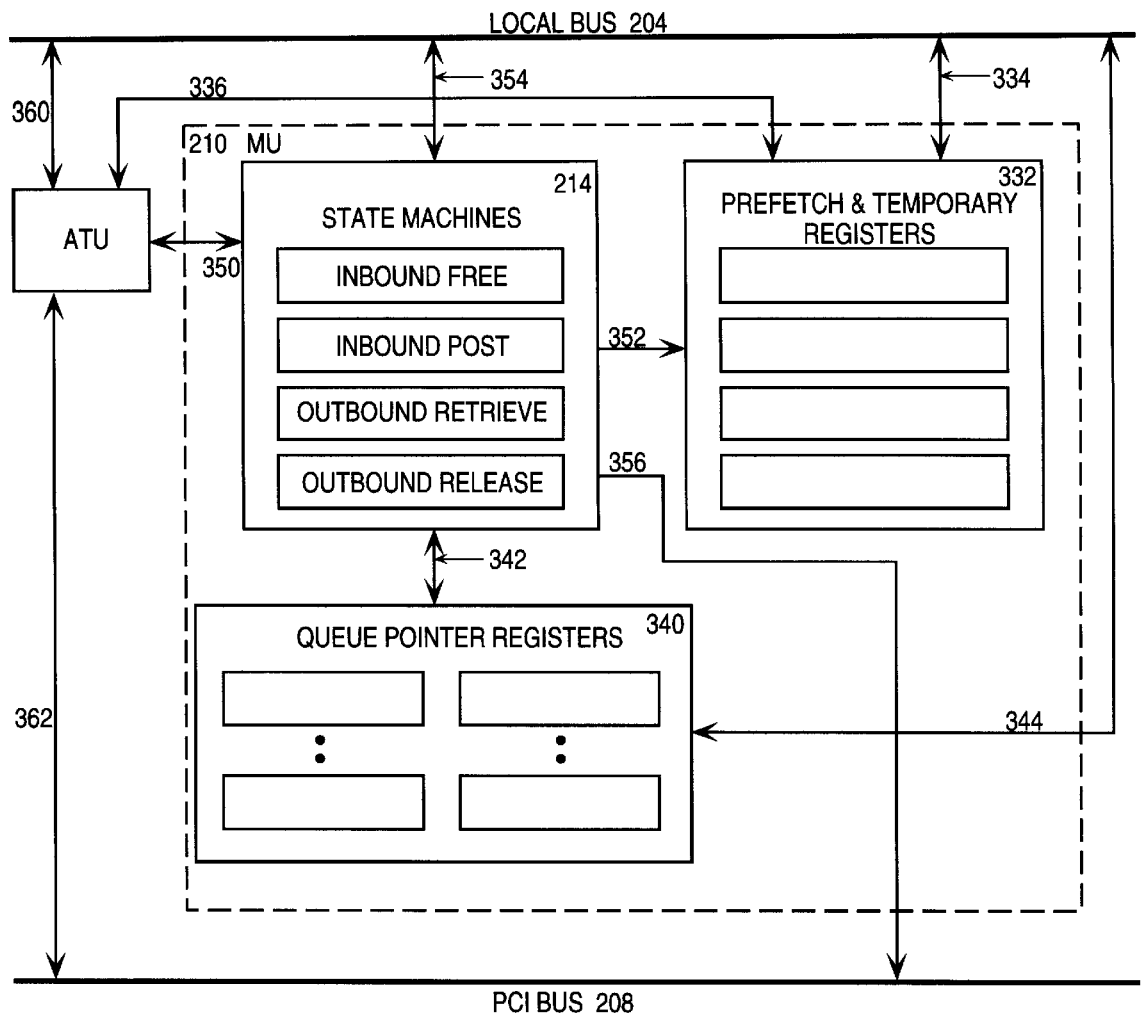
FIG. 3 illustrates one embodiment of the present invention.

FIG. 3 illustrates the present invention, as embodied in the MU 210. The MU 210 includes a plurality of state machines 214 coupled to the ATU 218 through control path 350. The MU 210 also includes a plurality of prefetch and temporary registers 332. These registers 332 are coupled to the ATU 218 through data path 336. The prefetch and temporary registers 332 are also controlled by the control state machine 214 through data path 352. The registers 332 are also coupled to the local bus 204 through data path 334 for accessing local memory 206.

In this embodiment, the MU 210 includes a message passing scheme that uses 4 circular queues. There are four prefetch and temporary registers 332 in this embodiment. Two registers are provided to allow the host processor to write data to the circular queues. Two registers are provided to allow the host processor to read data from one of the circular queues.

The MU 210 also includes a plurality of queue pointer registers 340 that are coupled to the control state machines 214 through data path 342. These registers 340 store the head and tail pointers of the queues 207. These queues will be described in greater detail with respect to FIGS. 4 and 5.

Circular Queues

The MU 210 provides access for the bus agent 201 to four circular queues 207. There are two inbound queues and two outbound queues. "Inbound" and "outbound" refer to the direction of the flow of active messages. "Inbound" messages are either new messages posted by bus agent 201 for the local processor 202 to process or are empty or free message buffers that are available for use by the bus agents 201. "Outbound" messages are either posted messages by the local processor 202 for the host processor 201 to process or are free message buffers that are available for use by the local processor 202.

In one embodiment, there are four circular queues that are used to pass messages between host processor/bus agent 201 and the local processor 202. There are two inbound queues that are used to handle inbound messages, and there are two outbound queues used to handle outbound messages. One of the inbound queues is designated as a Free queue, and it contains inbound free message handles. A message handle is a logical or physical address of a message buffer. The other inbound queue is designated the Post or work queue, and it contains inbound posted message handles. Similarly, one of the outbound queues is designated a Free Queue, and the other outbound queue is designated a Post Queue.

The two outbound queues allow the local processor 202 to post outbound messages in the Post queue and to receive freed messages returning from an external host processor 201 into the outbound Free Queue. The two inbound queues allow the bus agent 201 to acquire a free message buffer from the inbound free queue and subsequently post that buffer to the inbound free queue for processing by the local processor 202.

The data storage for the circular queues 207 are provided by local memory 206. In this particular implementation, each entry in the queue is a 32-bit data value which is a message handle. Moreover, a read from or write to a queue may access exactly one queue entry.

Each circular queue has a head pointer and a tail pointer. Writes to a queue occur at the head of the queue and reads occur from the tail. The head and tail pointers are incremented by software running on the local processor 202 or by the messaging unit 210. The details concerning how the head and tail pointers are incremented by the local processor 202 and the MU 210 are described hereinafter.

The head and tail pointers are offsets into each respective circular queue and range from 0 to the circular queue size minus 1 (i.e., begin labeling the pointers with 0). The pointers are incremented after each queue access. Both head and tail pointers wrap around to 0 when they reach the circular queue size (i.e., end of the queue).

The Messaging Unit 210 generates an interrupt to the local processor 202 or generates a PCI bus interrupt (i.e., interrupt to an external processor) under certain conditions. In general, when a post queue is written, an interrupt is generated to notify the target processor that a message was posted.

In one embodiment the size of each circular queue can range from 16 Kbytes (4096 handles) to 256 Kbytes (65536 handles). Moreover, in this embodiment all four queues are of the same size and are contiguous. The total amount of local memory required by the circular queues thus ranges from 64 Kbytes to 1 Mbytes. These queues reside in local memory 206, and the head and tail pointers of the queues reside in registers in the MU 210. The queue size is determined by the Queue Size field in the Messaging Unit Configuration Register (MUCR). One possible format of the MUCR is shown in Table 1. In this embodiment there is also one base address for all four queues. The starting addresses of each queue is based on the Queue Base Address and the Queue Size field. The base address is stored in a Queue Base Address Register (QBAR) which also resides in the MU 210. One possible format of the QBAR is shown in Table 2. An embodiment to be illustrated in FIGS. 6–9 includes a separate base address for each queue.

TABLE 1

| MU Configuration Register - MUCR | | | |
|---|---|---|---|
| Bit | Default | Read/Write | Description |
| 31:05 | 0000000H | Read Only | Reserved |
| 04:00 | $00000_2$ | Read/Write | Queue Size - This field determines the size of each Circular Queue. All four queues are the same size. |

TABLE 2

QUEUE BASE ADDRESS REGISTER - QBAR

| Bit | Default | Read/Write | Description |
|---|---|---|---|
| 31:2 | 000H | Read/Write | Queue Base Address - Local memory address of the; circular queues. |
| 19:0 | 00000H | Read only | Reserved |

Figure 4:
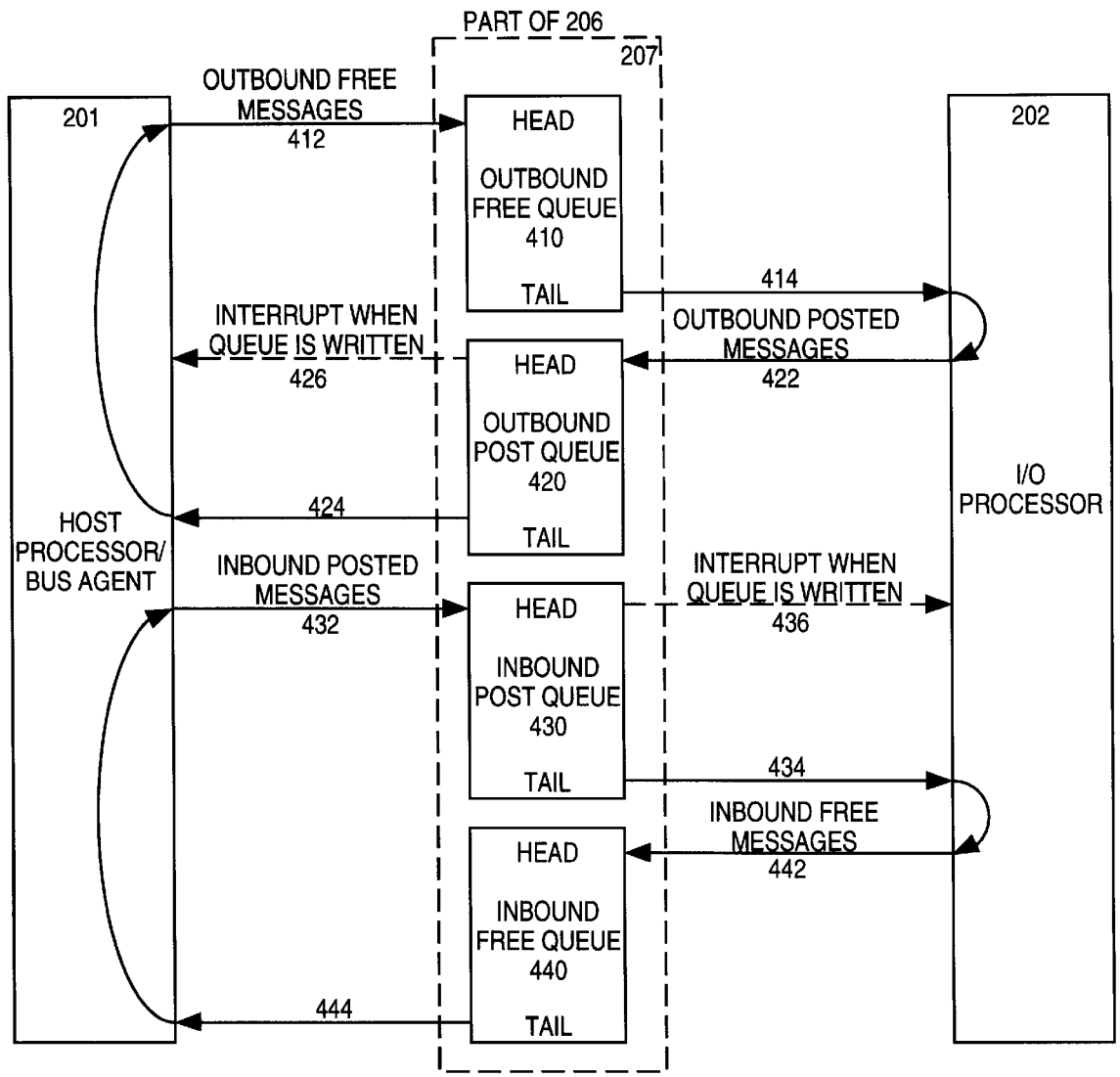
FIG. 4 illustrates the circular queues of the present invention.

FIG. 4 illustrates four circular queues of the present invention. There are two outbound queues 410 and 420 and two inbound queues 430 and 440, residing in local memory 206.

The local processor 202 posts outbound messages 422 by writing to the head of the outbound post queue 420. The host processor 201 retrieves the posted messages from the outbound post queue 420 by reading from the tail of the outbound post queue 420.

A host processor 201 releases outbound message buffers 412 by writing to the head of the outbound free queue 410. The local processor 202 reads free messages buffers 414 from the tail of the outbound free queue 410.

A host processor or bus agent 201 posts inbound messages 432 to an inbound post queue 430 by writing to the head of the inbound post queue 430. The local processor 202 reads these posted messages from the tail of the inbound post queue 430. When the host processor writes to the inbound post queue 430 an interrupt is generated 436 to the local processor 202.

When messages are posted to the outbound post queue 420 by the local processor 202 an interrupt 426 is generated to the host processor 201. The interrupts as specified by the PCI Bus Specification Revision 2.0 may be used here.

The local processor 202 returns free message buffers 442 to the inbound free queue 440 by writing to the head of this queue 440. The host processor/bus agent 201 acquires a free message buffer by reading from the tail of the inbound free queue 440 through data path 444.

Figure 5:
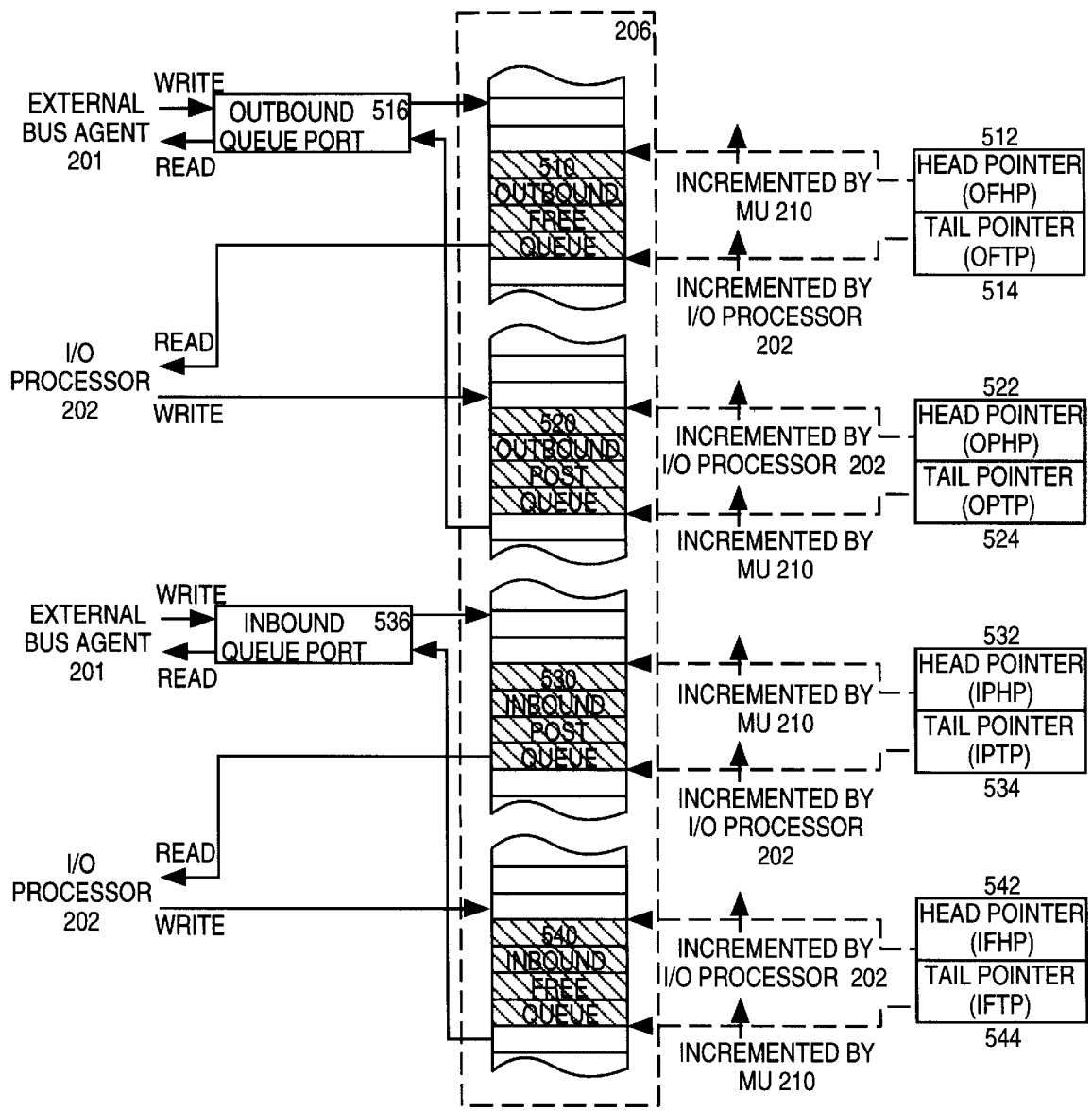
FIG. 5 further illustrates circular queue operation for the present invention.

FIG. 5 illustrates an Outbound Free Queue 510, an Outbound Post Queue 520, an Inbound Post Queue 530, and an Inbound Free Queue 540.

Outbound Free Queue

The Outbound Free Queue (OFQ) 510 holds the handles for empty messages placed there (i.e., released) by bus agents 201 for the local processor 202 to use. A host processor 201 releases a message buffer to the OFQ 510 by writing to a register in an Outbound Queue Port 516. The OFQ 510 is read from the queue tail by the local processor 202, and is written to the queue head by the host processor 201. The head pointer (OFHP) 512 is maintained by the Messaging Unit 210. The Outbound Free Queue tail pointer (OFTP) 514 is maintained by software running on the local processor 202.

For a PCI write transaction that accesses the Outbound Queue Port 516, the MU 210 writes a message handle (i.e., an address to a free message buffer) to a location in local memory 206 pointed to by the head pointer (OFHP) 512, which is stored in an Outbound Free Head Pointer Register (OFHPR) 926. The local memory address is the Queue Base Address Register+3*Queue Size+Outbound Free Head Pointer Register (OFHPR) 926. One possible format of the OFHPR is shown in Table 3.

When data that is written to the Outbound Queue Port 516 is written to local memory 206, the MU 210 increments the OFHP 512.

From the time that a PCI write transaction is received by the MU 210 until data is written into local memory 206, and the OFHP 512 is incremented, any PCI transaction that attempts to access the Inbound Queue Port 516 is delayed by inserting wait states. If a PCI latency violation occurs while inserting wait states, the external PCI agent 201 is signaled a Retry.

The local processor 202 retrieves message buffer handles from the OFQ 510 by reading the local memory location pointed to by the Outbound Free Queue tail pointer (OFTP) 514. The local memory address is Queue Base Address Register+3* Queue size+Outbound Free Tail Pointer Register (OFTPR) 438. One possible format of the OFTPR is shown in Table 4. The local processor 202 then increments the OFTP 514 in the Outbound Free Tail Pointer Register 938 (shown in FIG. 9A).

TABLE 3

Outbound Free Head Pointer Register - OFHPR

| Bit | Default | Access | Description |
|---|---|---|---|
| 31:19 | 0000H | Read Only | Reserved |
| 18:02 | 0000H | Read/Write | Outbound Free Head Pointer - Local memory offset of the head pointer for the Outbound Post Queue |
| 01:00 | 00₂ | Read Only | Reserved |

TABLE 4

Outbound Free Tail Pointer Register - OFTPR

| Bit | Default | Access | Description |
|---|---|---|---|
| 31:19 | 0000H | Read Only | Reserved |
| 18:02 | 0000H | Read/Write | Outbound Free Tail Pointer - Local memory offset of the tail pointer for the Outbound Free Queue |
| 01:00 | 00₂ | Read Only | Reserved |

Outbound Post Queue

The Outbound Post Queue (OPQ) 520 stores handles of posted messages placed there by the local processor 202 for the host processor 201 to retrieve and process. The host processor 201 retrieves a message from the OPQ 520 by reading a register in the Outbound Queue Port 516. The local processor 202 adds to the OPQ 520 by writing to the queue head. The head pointer (OPHP) 522 is maintained by the local processor 202. The tail pointer (OPTP) 524 is maintained by the Messaging Unit 210.

Figure 8A:
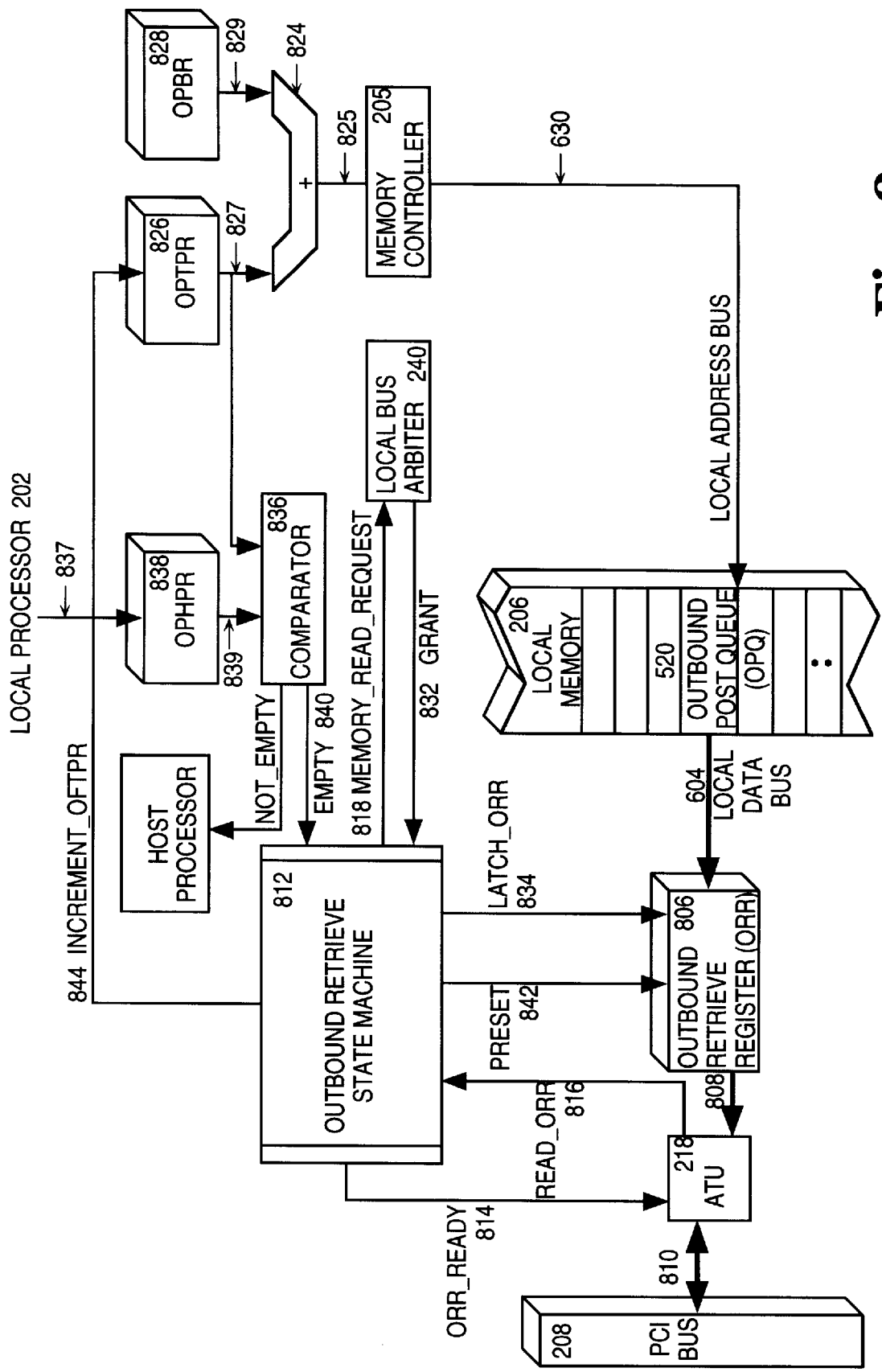
FIGS. 8A illustrates an Outbound Retrieve State Machine of the present invention.

For a PCI read transaction that accesses the Outbound Queue Port 516, the MU 210 prefetches the data at the local memory location pointed to by the OPTP 524. The local memory address is Queue Base Address Register+2*Queue Size+Outbound Post Tail Pointer Register (OPTPR) 826 (as shown in FIG. 8A). If the OPQ 520 is not empty (i.e., the head 522 and tail pointers 524 are not equal), a message handle is supplied for the requesting processor 201. If the OPQ 520 is empty (i.e., the head 522 and tail pointers 524 are equal), the value of −1 (FFFF.FFFFH) is supplied for the requesting processor 201. If the OPQ 520 queue is not empty, and the MU 210 succeeds in prefetching the data at the tail, the MU 210 increments the tail pointer (OPTR) 524 in the OPTPR 826.

As stated, a prefetch mechanism loads a value of −1 (FFFF.FFFFH) into a prefetch register 806 (which will be described further with a reference to FIG. 8A) if the head 522 and tail 524 pointers are equal (i.e., the OPQ 520 is empty). In order to update the ORR 806 when messages are added to the OPQ 520, and it becomes non-empty, the prefetch mechanism in the MU 210 automatically starts a prefetch if the ORR 806 contains FFFF.FFFFH, and the Outbound Post Head Pointer Register (OPHPR) 422 is written to by the local 202 processor. One possible format of the OPHPR is shown in Table 5. The local processor 202 updates the OPHPR 422 when the local processor 202 adds messages to the OPQ 520.

A prefetch must appear atomic from the perspective of an external bus agent 201. When a prefetch is started, any PCI transaction that attempts to access an Outbound Retrieve Register 806 (which will be described with reference to FIG. 8A) in the Outbound Queue Port 516 is delayed by inserting wait states until the prefetch is completed. If a bus latency violation occurs while inserting wait states, the external bus agent 201 is notified with a Retry signal.

A PCI interrupt is generated to the host processor 201 when the OPHP 522 is not equal to the OPTP 524. When the OPHP 522 and the OPTP 524 are equal, no interrupt is generated. The Output Post Queue Interrupt bit in the Outbound Doorbell Register indicates the status of the comparison of the values in the OPHPR 838 and OPTPR 828. The interrupt is cleared when the head 522 and tail 524 pointers are equal. This occurs when a host processor 201 reads enough queue entries to empty the OPQ 520. An interrupt may be masked by the Outbound Doorbell Mask Register, which is controlled by software.

The local processor 202 may place messages in the OPQ 520 by writing data to the local memory location pointed to by the head pointer (OPHP) 522. The local memory address is Queue Base Address Register+Outbound Post Head Pointer Register 838. One possible format of the OPTPR is shown in Table 6. The local processor 202 then increments OPHP 522 in the Outbound Post Head Pointer Register 838.

TABLE 5

Outbound Post Head Pointer Register - OPHPR

| Bit | Default | Access | Description |
| --- | --- | --- | --- |
| 31:19 | 0000H | Read Only | Reserved |
| 18:02 | 0000H | Read/Write | Outbound Post Head Pointer - Local memory offset of the head pointer for the Outbound Post Queue |
| 01:00 | $00_2$ | Read Only | Reserved |

TABLE 6

Outbound Post Tail Pointer Register - OPTPR

| Bit | Default | Access | Description |
| --- | --- | --- | --- |
| 31:19 | 0000H | Read Only | Reserved |
| 18:02 | 0000H | Read/Write | Outbound Post Tail Pointer - Local memory offset of the tail pointer for the Outbound Post Queue |
| 01:00 | $00_2$ | Read Only | Reserved |

Inbound Post Queue

The Inbound Post Queue (IPQ) 530 holds handles of posted messages placed there by bus agents 201 for the local processor 202 to process. The host processor 201 or bus agent posts a message to the IPQ 530 by writing to a register in the Inbound Queue Port 536. The IPQ 530 is read from the queue tail by the local processor 202 and is written to the queue head by external bus agents 201. The tail pointer (IPTP) 534 is maintained by software running on the local processor 202. The head pointer (IPHP) 532 is maintained by the MU 210.

Figure 7A:
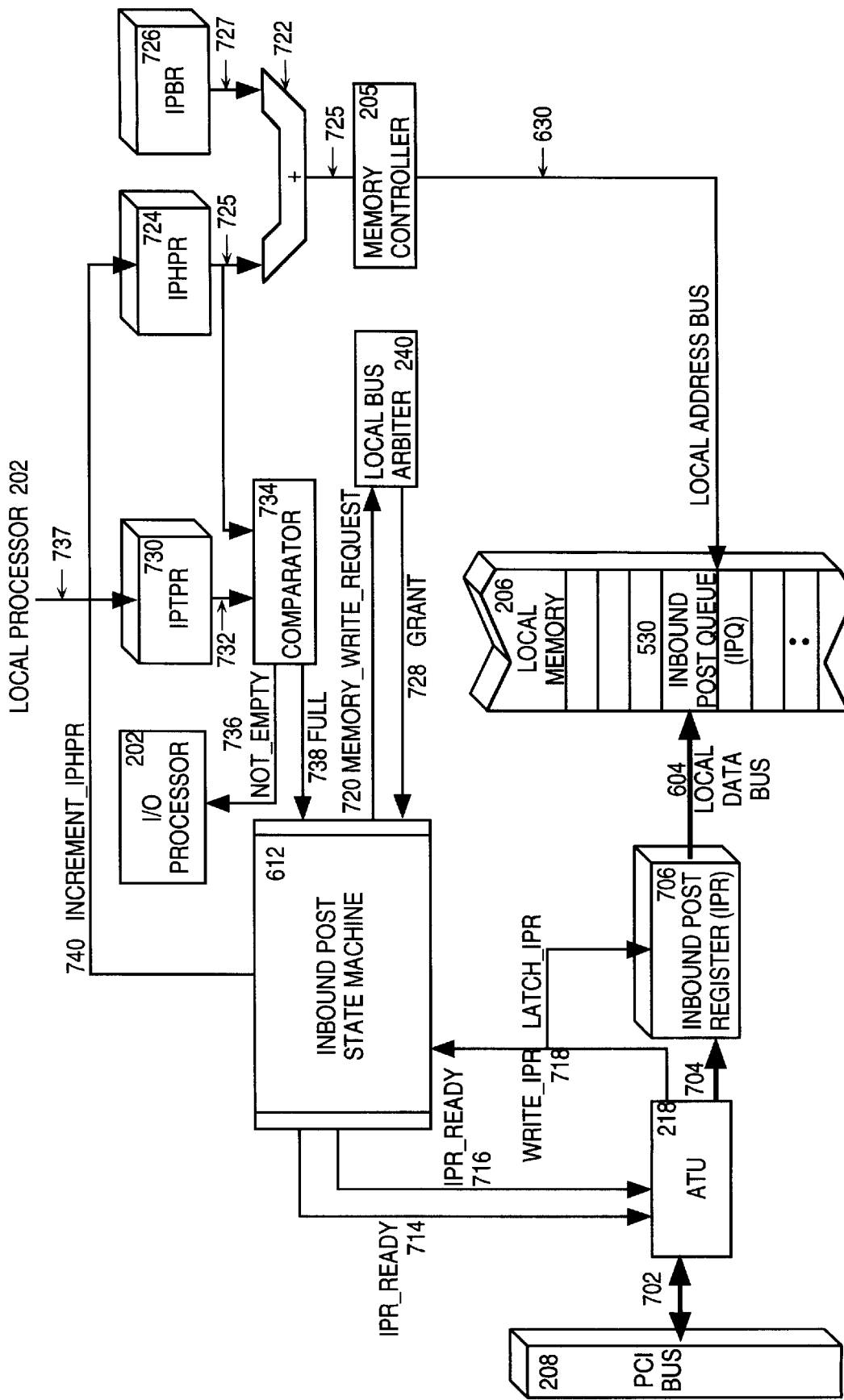
FIGS. 7A illustrates an Inbound Post State Machine of the present invention.

For a PCI write transaction that accesses the Inbound Queue Port (IQP) 536, the MU 210 writes the data to a local memory location pointed to by the IPHP 532 stored in Inbound Post Head Pointer Register (IPHPR) 724 (shown in FIG. 7A). The local memory address is Queue Base Register+Queue Size+Inbound Post Head Pointer Register (IPHPR) 724. One possible format of the IPHPR is shown in Table 7. One possible format of the IPTPR is shown in Table 8.

When the data written to the Inbound Queue Port 536 is written to local memory 206, the MU 210 increments the IPHPR 724. When data is written to local memory 206 and the IPHPR 724 is incremented, the MU 210 generates an interrupt to the local processor 202. This interrupt is recorded by setting the Inbound Post Queue Interrupt bit of the Inbound Doorbell Register. The interrupt may be masked by the Inbound Doorbell Mask Register, which is controlled by software.

TABLE 7

Inbound Post Head Pointer Register - IPHPR

| Bit | Default | Access | Description |
| --- | --- | --- | --- |
| 31:19 | 0000H | Read Only | Reserved |
| 18:02 | 0000H | Read/Write | Inbound Post Head Pointer - Local memory offset of the head pointer for the Inbound Post Queue |
| 01:00 | $00_2$ | Read Only | Reserved |

TABLE 8

Inbound Post Tail Pointer Register - IPTPR

| Bit | Default | Access | Description |
| --- | --- | --- | --- |
| 31:19 | 0000H | Read Only | Reserved |
| 18:02 | 0000H | Read/Write | Inbound Post Tail Pointer - Local memory offset of the tail pointer for the Inbound Post Queue |
| 01:00 | $00_2$ | Read Only | Reserved |

Inbound Free Queue

An Inbound Free Queue 540 holds handles of empty message buffers placed there by the local processor 202 for bus agents 201 to use. The host processor 201 is allocated a message buffer from the IFQ 540 by reading a register in the Inbound Queue Port 536. The Inbound Free Queue 540 is read from the queue tail by external bus agents 201 and is written to the queue head by the local processor 202. The head pointer 542 is maintained by software running on the local processor 202. The tail pointer (IFTP) 544 is maintained by the MU 210.

Figure 6A:
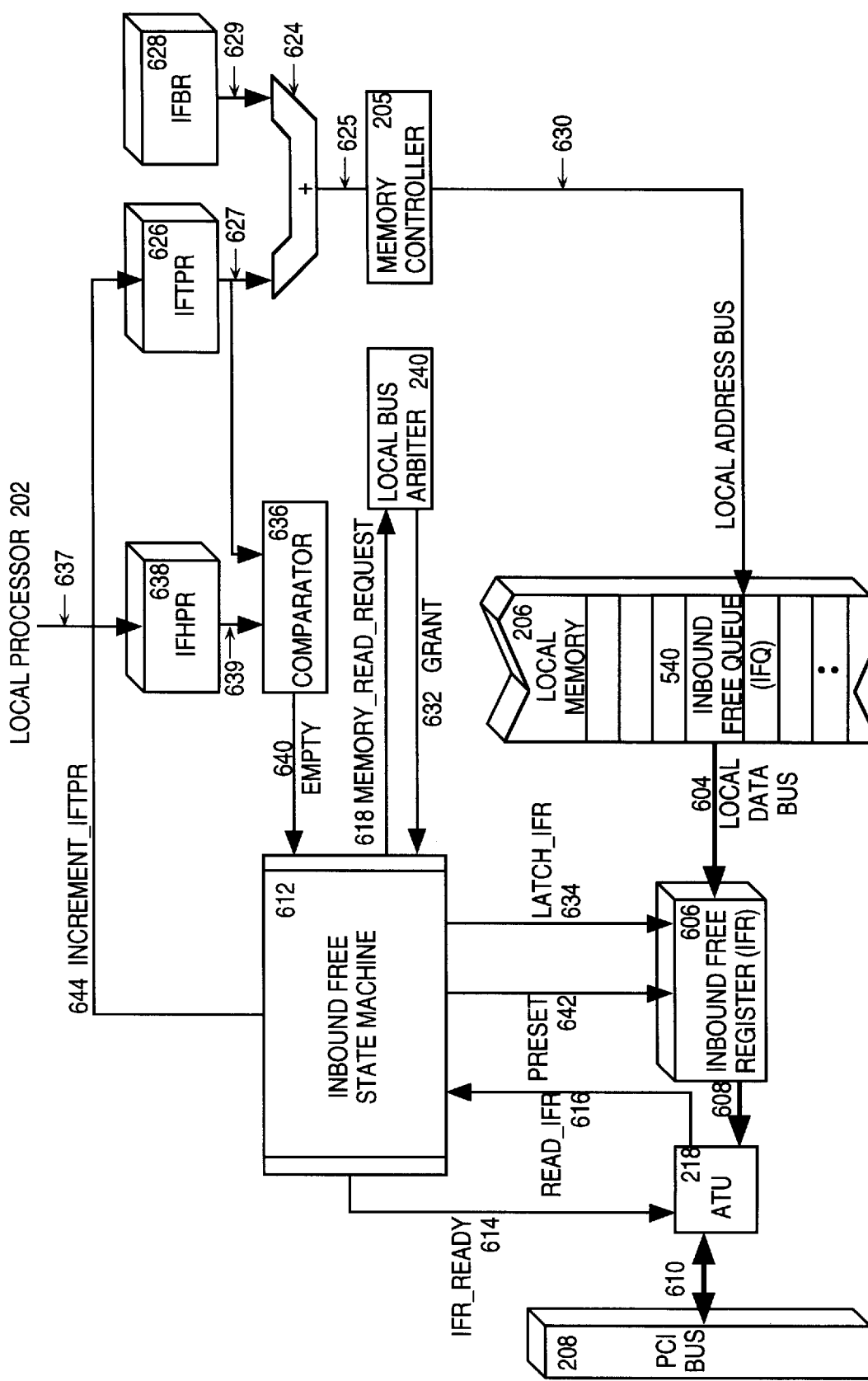
FIGS. 6A illustrates an Inbound Free State Machine of the present invention.

For a PCI read transaction that accesses the Inbound Queue Port (IQP) 536, the MU 210 prefetches the data at a local memory location pointed by the IFTP 544. The local memory address is Queue Base Address Register+Inbound Free Tail Pointer Register (IFTPR) 626 that stores the tail pointer. One possible format of the IFTPR is shown in Table 10. If the IFQ 540 is not empty (i.e., head and tail pointers are not equal), the data pointed to by IFTP 544 is supplied for the next access by the host processor or bus agent. If the IFQ 540 is empty (i.e., head and tail pointers are equal), the value of −1 (FFFF.FFFFH) is supplied for the requesting host processor or bus agent. If the IFQ 540 was not empty, and the MU 210 prefetches the data pointed to by the IFTP 544, the MU 210 increments the value of the pointer in the Inbound Free Tail Pointer Register (IFTPR) 626 (as shown in FIG. 6A).

To reduce latency for the PCI read access, the MU 210 implements a prefetch mechanism to anticipate accesses to the IFQ 540. The MU 210 prefetches data from the tail of the IFQ 540 and loads it into an internal prefetch register. When a PCI read access occurs, the data can be read directly from the prefetch register.

The prefetch mechanism loads a value of −1 (FFFF.FFFFH) into the prefetch register if the head and tail pointers are equal (i.e., IFQ 540 is empty). In order to update the prefetch register when messages are added to the IFQ 540 and it becomes non-empty, the prefetch mechanism automatically starts a prefetch if the prefetch register contains FFFF.FFFFH, and the Inbound Free Head Pointer Register (IFHPR) 638 is written. One possible format of the IFHPR is shown in Table 9. The software running on the local processor 202 updates the IFHP 542 when it adds messages to the IFQ 540.

A prefetch must appear atomic from the perspective of an external bus agent 201. When a prefetch is started, any PCI transaction that attempts to access the Inbound Free Register in the Inbound Queue Port 536 is delayed by inserting wait states until the prefetch is completed. If a PCI latency violation occurs while inserting wait states, the external bus agent 201 is signaled a Retry by the MU 210.

The local processor 202 may place messages in the IFQ 540 by writing the data to the local memory location pointed to by the head pointer (IFHP) 542. The local memory address is Queue Base Address Register+Inbound Free Head Pointer Register (IFHPR) 638. The software running on the local processor 202 then increments the IFHPR 638.

Inbound Free Table

TABLE 9

Inbound Free Head Pointer Register - IFHPR

| Bit | Default | Access | Description |
|---|---|---|---|
| 31:19 | 0000H | Read Only | Reserved |
| 18:02 | 0000H | Read/Write | Inbound Free Head Pointer - Local memory offset of the head pointer for the Inbound Free Queue. |
| 01:00 | 00₂ | Read Only | Reserved |

TABLE 10

Inbound Free Tail Pointer Register - IFTPR

| Bit | Default | Access | Description |
|---|---|---|---|
| 31:19 | 0000H | Read Only | Reserved |
|  | 0000H | Read/Write | Inbound Free Tail Pointer - Local memory offset of the tail pointer for the Inbound Free Queue. |
| 01:00 | 00₂ | Read Only | Reserved |

FIG. 6A illustrates how the present invention, embodied in the MU 210, allocates free message buffers to bus agents on the PCI bus. Data moves from an Inbound Free Queue (IFQ) 540 located in local memory 206 through local data bus to an Inbound Free Register (IFR) 606. In this context data specifically refers to an address of a message buffer (i.e., message handle). Subsequently, the data travels from the Inbound Free Register 606 through data path 608 to ATU 218, and thereafter to bus agents on PCI bus 208 through data path 610.

The MU 210 includes an Inbound Free state machine 612 for allocating free message buffers that issues and receives a number of control signals. The state diagram for the Inbound Free state machine 612 will be further described with reference to FIG. 6B.

To request a message buffer from IFQ 602, a bus agent sends a read transaction through the PCI bus 208 and data path 610 to the ATU 218. A read transaction specifying the address of the Inbound Free Register 606 is detected by the ATU 218. Once the ATU 218 detects that a bus agent wants to read the Inbound Free Register 606, the ATU tests the state of the IFR_Ready signal 614. If an IFR_Ready signal 614 is asserted the ATU completes the PCI transaction supplying the data in the IFR 606 to the ATU 218 through path 608 and generates a Read_Inbound_Free signal 616 to state machine 612.

If the IFR_Ready signal 614 is de-asserted (i.e., state machine 612 is not ready), the ATU 218 inserts wait states, and does not send the Read_IFR 616 until the IFR_Ready signal 614 is asserted. The IFR_Ready signal 614 is de-asserted when there is stale data in the IFR 606 (i.e., state machine 612 has not yet completed a Prefetch of data into IFR 606).

Once state machine 612 receives the Read_IFR signal 616, state machine 612 sends a Memory_Read_Request signal 618 to a local bus arbitrator 240 and de-asserts the IFR_Ready signal 614. Upon a Grant signal 632, the MU 210 simply asserts the proper tail address of the IFQ 602 onto the local address bus 630. Data is then transferred from the local memory 206 to the IFR 606 (i.e., reads the value at the tail of the IFQ 602) through the local data bus 604. MU 210 includes an adder 624 that calculates the appropriate tail address of the IFQ 602. Adder 624 generates the sum of the contents of the Inbound Free Tail Pointer Register (IFTPR) 626 and the Inbound Free Base Register (IFBR) 628.

After the data pointed to by the tail pointer of the IFQ 540 is on the local data bus 604, state machine 612 sends a Latch signal 634 to latch the data on the local data bus 604 into the IFR 606 and sends an Increment signal 644 to the IFTPR 626. Thus, a prefetch of the next available message buffer has been accomplished.

The MU 210 also includes a comparator 636 that compares the value in the Inbound Free Head Pointer Register (IFHPR) 638 and the value in the Inbound Free Tail Pointer Register (IFTPR) 626. If these two values are equal, comparator 636 generates an Empty signal 640 (i.e., there are no free message buffers in the queue). This Empty signal 640 is sent to state machine 612 and causes state machine 612 to assert a Preset signal 642. The Preset signal 642 causes the content of IFR 606 to be set to a predetermined value that is reserved for an empty indication (i.e., not a valid buffer address).

When a bus agent reads the IFR 606, it either immediately accesses prefetched data stored in the IFR 606, or the Preset value, that indicates that the IFQ 602 is Empty.

Figure 6B:
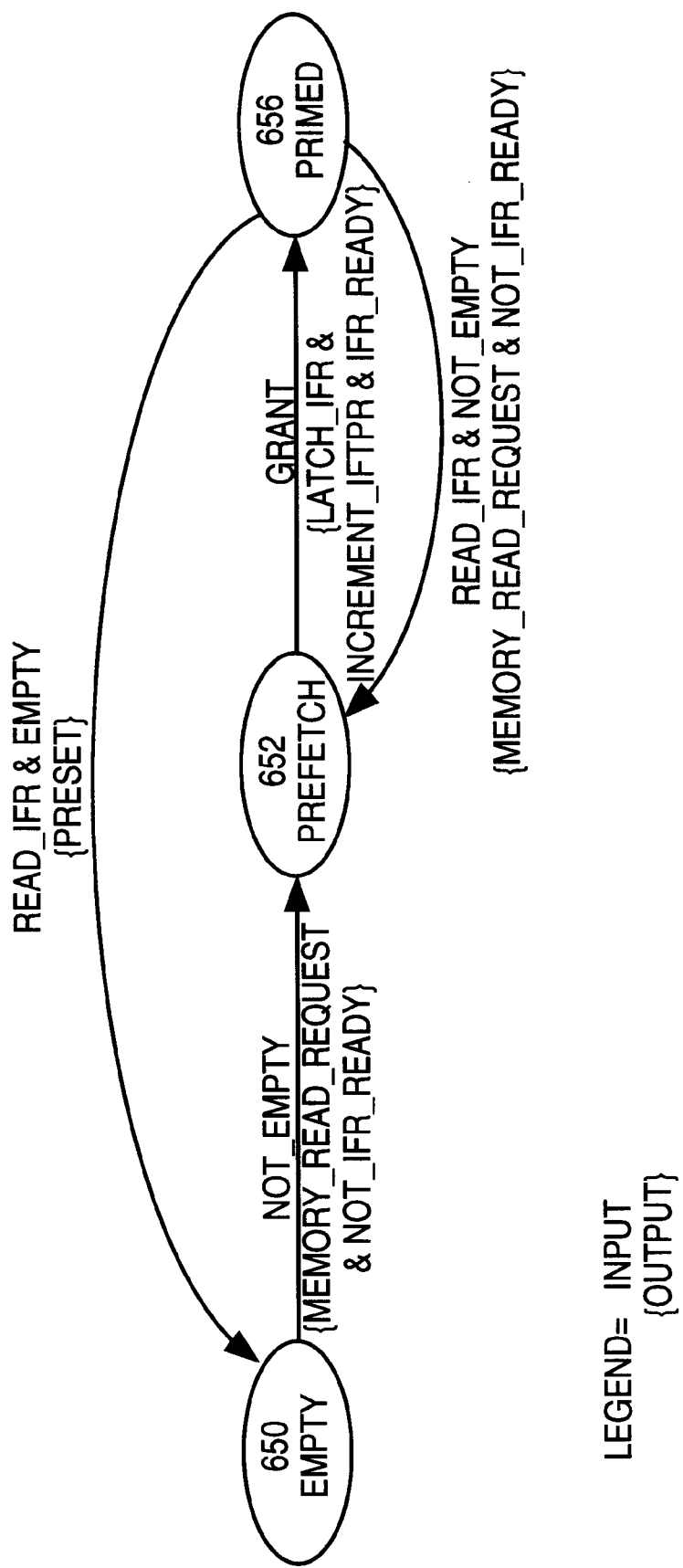
FIG. 6B illustrates a state diagram for the Inbound Free State Machine.

FIG. 6B illustrates the state diagram for Inbound Free state machine 612. State machine 612 has three stages:

Empty 650, a Prefetch 652 and Primed 656. State machine 612 is in the Empty state 650 until the Empty signal is de-asserted 654. A not_Empty signal transitions the state machine 650 from an Empty state 612 to Prefetch state 652, and the state machine 612 issues a Memory_Read_Request signal 618 and de-asserts the IFR_Ready signal 614.

The state machine 612 transitions from the Prefetch state 652 to a Primed state 656 upon a Grant signal 632. Upon receiving a Grant signal 632, state machine 612 outputs a Latch_IFR signal 634, an Increment_IFTPR signal 644, and asserts an IFR_Ready signal 614. The state machine 612 transitions from the Primed state 656 to the Prefetch state 652 when the Read_IFR signal 616 is received, and the Empty signal 654 is not asserted. This transition also generates a Memory_Read_Request signal 618 and de-asserts the IFR_Ready signal 614.

The state machine 612 transitions from the Primed state 656 to the Empty state 650 when the Read_IFR signal 616 is received, and the Empty signal 640 is asserted. This transition generates the Preset signal 642.

FIG. 7A illustrates how the present invention posts a message, generated by a bus agent, into the Inbound Post Queue (IPQ) 530 which is located in local memory 206.

When a bus agent wants to write to an Inbound Post Register (IPR) 706, the data travels from the PCI bus 208 through data path 702 to the ATU 218, and then to the IPR 706 through data path 704. After the data is latched into the IPR 706, it is transferred through local data bus 604 into the IPQ 530 in local memory 206.

The ATU 218 tests the state of an IPR_Ready signal 716. If the IPR_Ready signal 716 is asserted, the ATU 218 completes the PCI transaction by supplying data to the IPR 706 and generating a Write_IPR signal 718 to the state machine 712.

If the IPR_Ready signal 716 is not asserted, the ATU 218 inserts wait states, and completes the PCI transaction when the IPR_Ready signal 716 is asserted. The requesting process retains control of the bus, and the PCI transaction is completed unless PCI latency rules are violated.

The ATU 218 also tests the state of an IPR_Retry signal 714. If the IPR_Retry signal 714 is asserted, the PCI transaction is not completed, and a retry is signaled to requesting process so it will release the bus and try again at a later time.

Figure 7B:
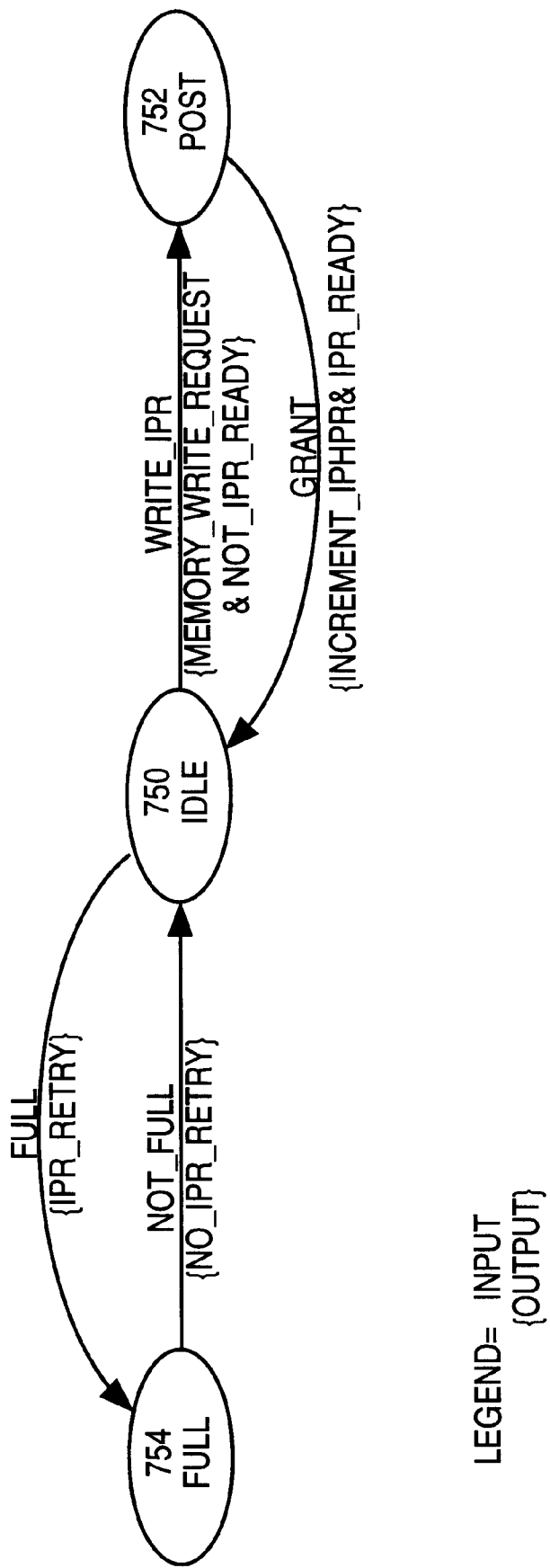
FIG. 7B illustrates the state diagram for the Inbound Post State Machine.

The Inbound Post state machine 712 of the MU 210 is further illustrated by a state diagram illustrated in FIG. 7B. State machine 712 has three states: an Idle state 750, a Post state 752 and a Full state 754. State machine 752 will transition from an Idle state 750 to a Post state 752 when a Write_Inbound_Post signal 718 is asserted by the ATU 218. When the Write_Inbound_Post signal is received by the state machine 712, the state machine 712 generates a Memory_Write_Request signal 720 and de-asserts the IPR_Ready signal 716. The state machine 712 transitions from a Post state 752 back to the Idle state 750 when the state machine 712 receives a Grant signal 728 from the local bus arbitrator 240. Upon receiving a Grant signal 728 and writing IPR data 604 to memory, the state machine 712 generates an Increment signal 740 to the Inbound Post Head Pointer Register (IPHPR) 724, and also asserts the IPR_Ready signal 716.

The state machine 712 transitions from an Idle state 750 to a Full state 754 when it receives a Full signal 738 from the comparator 734. A Full signal 738 is generated by the comparator 734 when the contents of the Inbound Post Tail Pointer Register (IPTPR) 730 and the Inbound Post Head Pointer Register (IPHPR) 724 indicate that the Inbound Post Queue (IPQ) 530 is Full. Upon receiving a Full signal 738, state machine 712 asserts a IPR_Retry signal 714 to the ATU 218.

State machine 712 transitions from a Full state 754 to an Idle state 750 when the Full signal 756 is de-asserted Full signal 756 (i.e., not_Full). Upon receiving a not_Full signal, the state machine 712 de-asserts the IPR_Retry signal 714.

Comparator 734 also generates a not_Empty signal 736 to interrupt generation logic (not shown) that generates a local interrupt to the I/O processor. Logic to generate a local interrupt upon receiving a not_Empty signal 736 is known in the art. This logic may also include interrupt registers and also mask registers controlled by software, to selectively mask out interrupts.

Increment signal 740 is sent to the IPHPR 724 and increments the Inbound Post Head Pointer. The adder 722 calculates a new inbound head pointer 723 by using the value 725 of the IPHPR 724 and the value 727 of IPBR 726. This address 723 is sent to memory controller 205 to access local memory through the local bus (i.e., local address bus 630).

As explained previously, the MU 210 asserts the address 723 on the local address bus 630 and enables the transfer of data (i.e., address of a message buffer) that is latched in the IPR 706 into the head of the IPQ 530.

FIG. 8A illustrates the Outbound Retrieve State Machine 812 and how the present invention allows a host processor or bus agent to retrieve posted messages from the Outbound Post Queue 520 (OPQ). When a host processor or bus agent retrieves a posted message handle, the data (i.e., the address of the Message Buffer) travels from the OPQ 520 located in local memory 206 to an outbound retrieve register (ORR) 806 through local data bus 604. The data is then passed from the ORR 806 through data path 808 to the outbound portion of the ATU 218. The data is then passed through data path 810 through PCI bus 208 to the respective host processor or bus agent. State machine 812 de-asserts ORR_Ready 814 to indicate stale data in ORR 806. When ORR_Ready signal 814 is de-asserted, the ATU 218 will insert wait states until the ORR_Ready signal 814 is asserted, which indicates that the ORR 806 contains valid data.

Figure 8B:
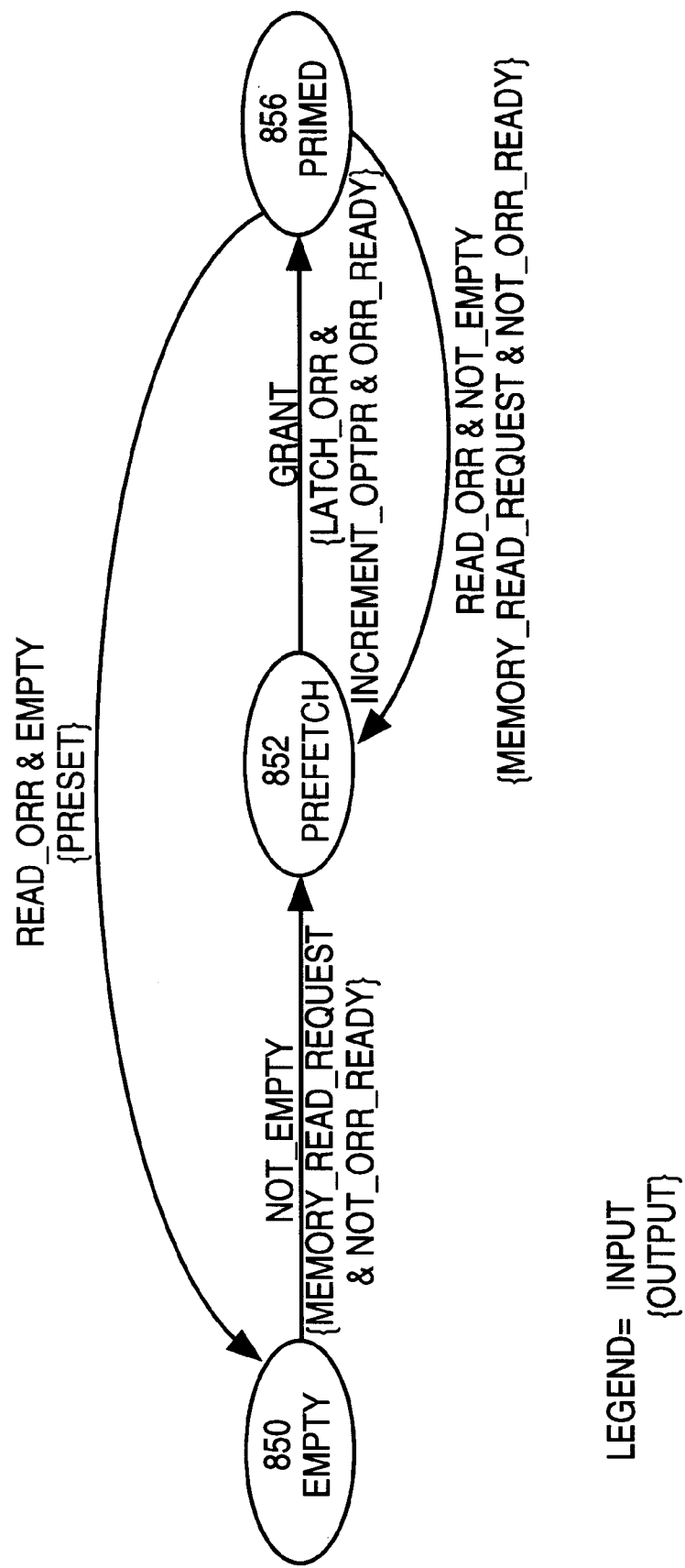
FIG. 8B illustrates a state diagram for the Outbound Retrieve State Machine.

The Outbound Retrieve state machine 812 of the MU 210 is further illustrated by a state diagram shown in FIG. 8B. The Outbound Retrieve state machine 812 has three states: Empty 850, Prefetch 852, and Primed 856. The Outbound Retrieve state machine transitions from the Empty state 850 to the Prefetch state 852 when the Empty signal 840 is de-asserted. In response, the Outbound Retrieve state machine 812 asserts a Memory_Read_Request 818 to the local bus arbitration unit 240 and de-asserts the ORR_Ready signal 814 while it waits for a Grant signal 832. While waiting for the Grant signal 832, the Adder 824 calculates the address of the next message (i.e., tail pointer), and places this address on the local address bus 630.

State machine 812 transitions from a Prefetch 852 to a Primed state 856 upon Grant signal 832. The memory controller 205 uses the address 825 and reads the appropriate message handle from the OPQ 520. This message handle (i.e., pointer) is placed on the local data bus 604 and transferred to the ORR 806. The state machine 812 then generates a Latch_ORR 834 to latch the data from the OPQ 520 into the ORR 806 and also generates the Increment_OFTPR signal 844 to increment the tail pointer of OPQ 520 which is stored in the OPTPR 826. After this prefetch is completed, and new data is latched into ORR 806, state machine 812 asserts a ORR_Ready signal 814 to notify the ATU 218 that it is ready to complete another transaction from the PCI bus 208.

The state machine 812 transitions from a Primed state 856 to a Prefetch state 852 when the Read_ORR signal 816 is generated, and the Empty signal 840 is de-asserted. In response, the state machine 812 asserts the Memory_Read_Request signal 818 to the local bus arbitrator 240 and de-asserts the ORR_ready signal 814 to the ATU 218, so that a later transaction will not read the contents of the ORR 806 until a prefetch has been completed.

State machine 812 transitions from a Primed state 856 to an Empty state 850 upon detecting a Read_ORR signal that is asserted when an empty signal 840 is asserted. In response, state machine 812 asserts a Preset signal 842. The Preset signal 842 causes the content of the ORR 806 to be set to a value that is reserved for an empty indication so that a transaction requesting a read from the OPQ 520 will be notified that the OPQ 520 is empty.

When comparator 836 compares the contents of OPHPR 838 and OPTPR 826, and the values are equal, the Empty signal 840 is asserted. A non_empty OPQ 520 (i.e., not_Empty) indicates that there are messages pending for processing by the host processor 201. The present invention includes logic (not shown) to generate an interrupt to the host processor 201 through the interrupt lines specified in the PCI Bus Specification Release 2.0.

Figure 9A:
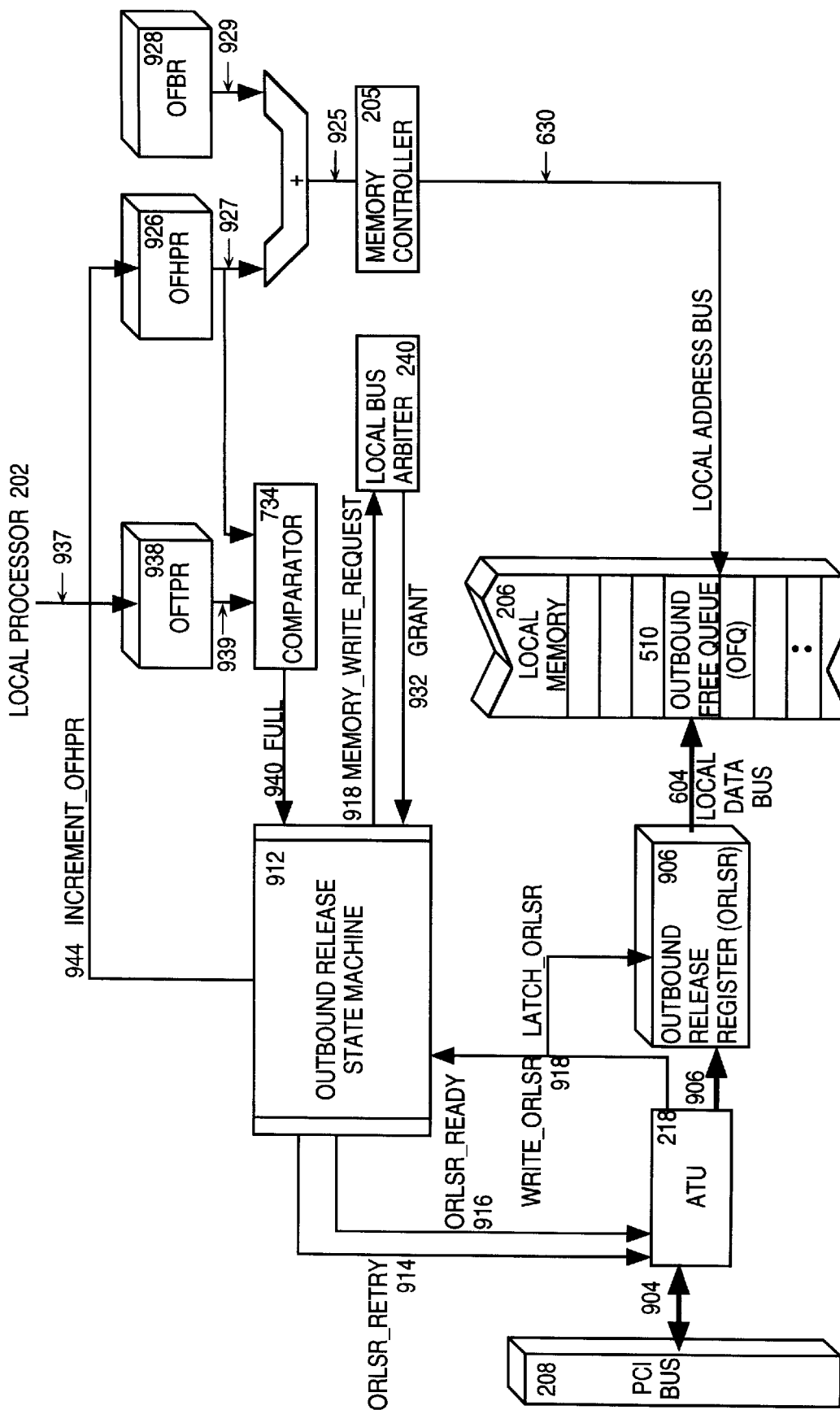
FIGS. 9A illustrates an Outbound Release State Machine of the present invention.
Figure 9B:
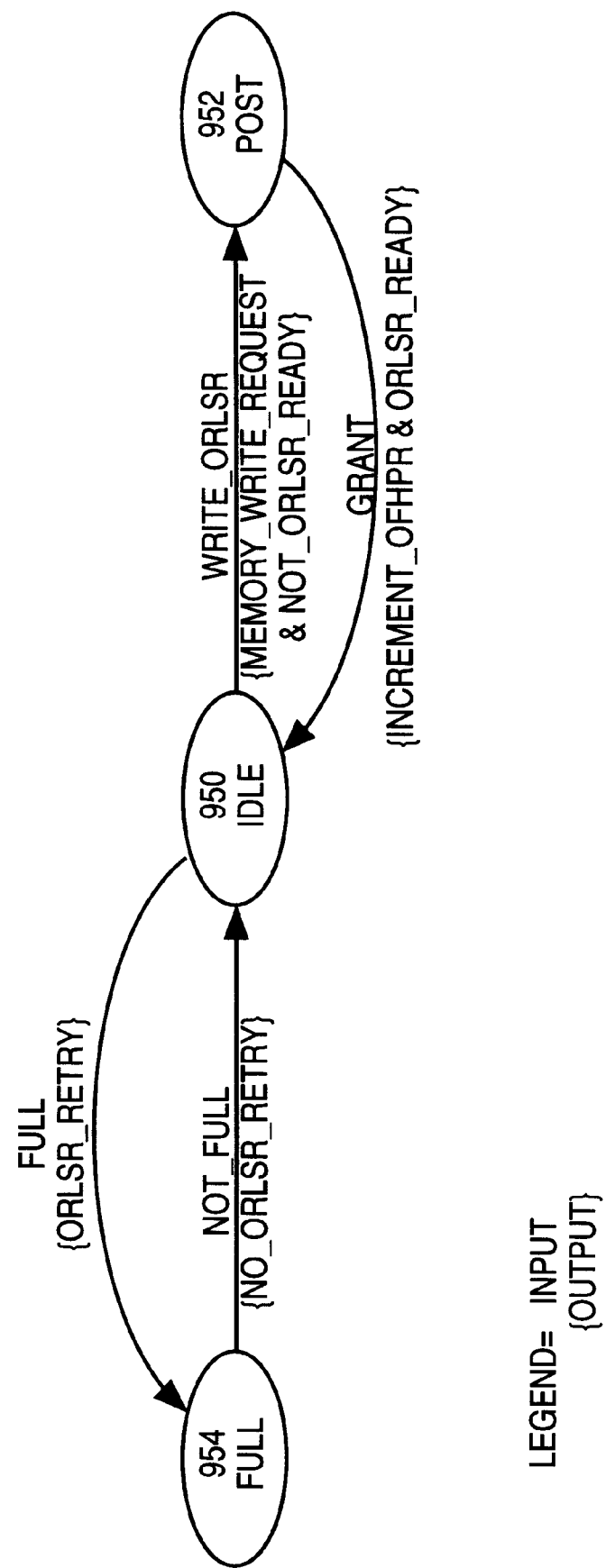
FIG. 9B illustrates a state diagram for the Outbound Release State Machine.

FIGS. 9A and 9B illustrate the Outbound Release state machine 912. After a host processor 201 processes a message, it returns the free message buffer pointer via the PCI bus 208 through data path 904 to the ATU 218 and is latched in an Outbound Release Register (ORLSR) 906. The free message buffer handle is then sent to the Outbound Free Queue (OFQ) 510 from the Outbound Release Register (ORLSR) 906 through local data bus 604. To release a free message buffer, a host processor 201 simply writes the address of that free message buffer to the ORLSR 906 in one bus transaction cycle.

The ATU 218 tests the state of an ORLSR_Ready signal 916 and an ORLSR_Retry signal 914. If the ORLSR_Retry signal 914 is de-asserted, the PCI transaction (i.e., write to the ORLSR 906) is not completed. The requesting process is signaled a Retry, and the requesting process releases control of the bus and tries again at a later time. If the ORLSR_Ready signal 916 is de-asserted, the ATU 218 inserts wait states until the ORLSR_Ready signal 916 is asserted. When the ORLSR_Ready signal 916 is asserted, the ATU 218 generates the Write_ORLSR signal 918 to the state machine 912 and latches data into the ORLSR 906.

FIG. 9B illustrates a state diagram for the Outbound Release state machine 912. State machine 912 has three states: a Full state 954, an Idle state 950 and a Post state 952. The state machine 912 transitions from an Idle state 950 to a Full state 954 when a Full signal 940 is asserted by comparator 936. In response to this Full signal 940, state machine 912 asserts a ORLSR_Retry signal 914 to the ATU 218. Upon generation of a ORLSR_Retry signal 914, the process that initiates a write transaction to the ORLSR 906 is signaled to try again at a later time.

The state machine 912 transitions from a Full state 954 to an Idle state 950 when the Full signal 940 is de-asserted. If the Outbound Free Queue OFQ 510 is not full, then state machine 912 de-asserts the ORLSR_Retry signal 914 (i.e., there is room in the OFQ 510 for an additional free message handle).

State machine 912 transitions from an Idle state 950 to a Post state 952 when it receives a Write_ORLSR signal 918 from the ATU 218. The Write_ORLSR signal 918 also serves to latch the free message handle into the ORLSR 906. In response to the Write_ORLSR signal 918 being asserted, state machine 912 asserts a Memory_Write_Request signal 918 to the local bus arbiter 240 and waits for a Grant signal 932 from the arbiter. An Adder 925 calculates the next position in the OFQ 510 where the next free message handle is to be written. State machine 912 also de-asserts the ORLSR_Ready signal 916 to prevent a subsequent transaction from overriding the data that is now latched in the ORLSR 906.

The state machine 912 transitions from a Post state 952 to an Idle state 950 when it receives a Grant signal 932 from the local bus arbiter 240. In response, the Outbound Release state machine 912 increments the head pointer in the OFHPR 926 through an Increment_OFHPR signal 944. State machine 912 also asserts the ORLSR_Ready signal 916, indicating to the ATU 218 that it has already stored the contents of the ORLSR 906, and that it has calculated the OFQ address to which the next free message handle is to be stored, and is ready for the next write to the ORLSR 906.

In summary, a host processor releases a free message buffer to the OFQ 510 by writing its handle to the ORLSR 906. If the OFQ 510 is full, the requesting process is notified to retry later. If the OFQ 510 is not full, the handle of the free message buffer is latched into the ORLSR 906. State machine 912 then waits for a Grant signal 932 from the local bus arbiter 240 to gain access to the local bus. Once control of the local bus is granted, state machine 912 transfers the data latched in the ORLSR 906 to the OFQ 510 at the location pointed to by the pre-calculated head pointer/address.

Thus, a method and apparatus that enables a remote process to allocate a message buffer then posts that message buffer to a work queue without the use of a semaphore or locking of the bus has been described.

Furthermore, a method and apparatus for retrieving a message from a work queue and releasing the message to a free queue after the message has been processed by a host processor, has been described.

The present invention also provides for scalability, flexibility, and compatibility with other platforms. For example, all platforms including an inbound message queue, as previously described, can easily send inter-processor messages. For compatibility with other platforms that do not implement an inbound message queue, an outbound message queue supplies that platform with an equivalent functionality without modifying the hardware of the platform. Moreover, the present invention allows for abstraction in that other platforms may use one platform's inbound queue concurrently without express knowledge that other processors exist in the computer system.

Thus, the present invention provides a method and apparatus for directly passing messages in a highly efficient manner between processors without requiring hardware modification to the processors in an asymmetric multi-processor system.

In the foregoing specification, the invention has been described with reference to specific exemplary embodiments thereof. It will however be evident that various modifications and changes made be made thereto without departing from the broader spirit and scope of the invention as set forth in the appended claims. The specification and drawings are accordingly to be regarded as illustrative rather than restrictive.

We claim:

1. A messaging unit coupled to a local processor and memory through a local bus, and further coupled to a host processor through a second bus, said messaging unit comprising:
   a) an inbound free storage means for storing handles of empty message buffers, placed therein by said host processor, for use by bus agents external to said messaging unit;
   b) an inbound free circuitry means coupled to the inbound free storage means for operating on data in an inbound free storage means, wherein the operation on data by the inbound free circuitry means further includes prefetching information from the inbound free storage means stored in the memory if the inbound free storage means is not empty, loading the inbound free storage means with a predetermined value if the inbound free storage means is empty, and allowing the host processor to read the inbound free storage means if the prefetch operation is completed;
   c) an inbound post storage means for storing handles of posted messages, placed therein by bus agents external to said messaging unit, for processing by said host processor; and
   d) an inbound post circuitry means coupled to inbound post storage means for operating on data in an outbound free storage means, wherein the operation on data by the inbound post circuitry means includes detecting if the inbound post storage means is full, returning a retry signal to the host processor if the inbound post storage means is full, and allowing the host processor to write the inbound post storage means if the inbound post storage means is not full and the current value stored in the inbound post storage means has been stored into the inbound post storage means;
   wherein the messaging unit provides access to the inbound free storage means and the inbound post storage means in a single bus transaction.

2. The messaging unit as set forth in claim 1 further comprising
   a) an outbound retrieve storage means for storing handles of posted messages, placed therein by said local processor, for processing by said host processor;
   b) an outbound retrieve circuitry means coupled to the outbound retrieve storage means for operating on data in an outbound post storage means;
   c) an outbound release storage means for storing handles of empty messages, placed therein by bus agents external to said messaging unit, for use by said host processor; and
   d) an outbound release circuitry means coupled to the outbound release storage means for operating on data in an outbound free storage means.

3. The messaging unit as set forth in claim 2
   wherein the operation on data by the outbound retrieve circuitry means further includes prefetching data from the outbound post storage means if the outbound post storage means is not empty, loading the outbound retrieve storage means with a predetermined value if the outbound post storage means is empty and allowing the host processor to read the outboard retrieve storage means if the prefetch is completed; and
   wherein the operation on data by the outboard release circuitry means further includes detecting if the outbound free storage means is full, returning a retry signal to the host processor if the outbound free storage means is full, and allowing the host processor to write the outbound release storage means if the outbound free storage means is not full and the current value in the outbound release storage means has been stored into the outbound free storage means.

4. The messaging unit as set forth in claim 2 wherein the second bus is a PCI bus.

5. The messaging unit as set forth in claim 2 wherein the storage means are registers.

* * * * *